Figure 1:
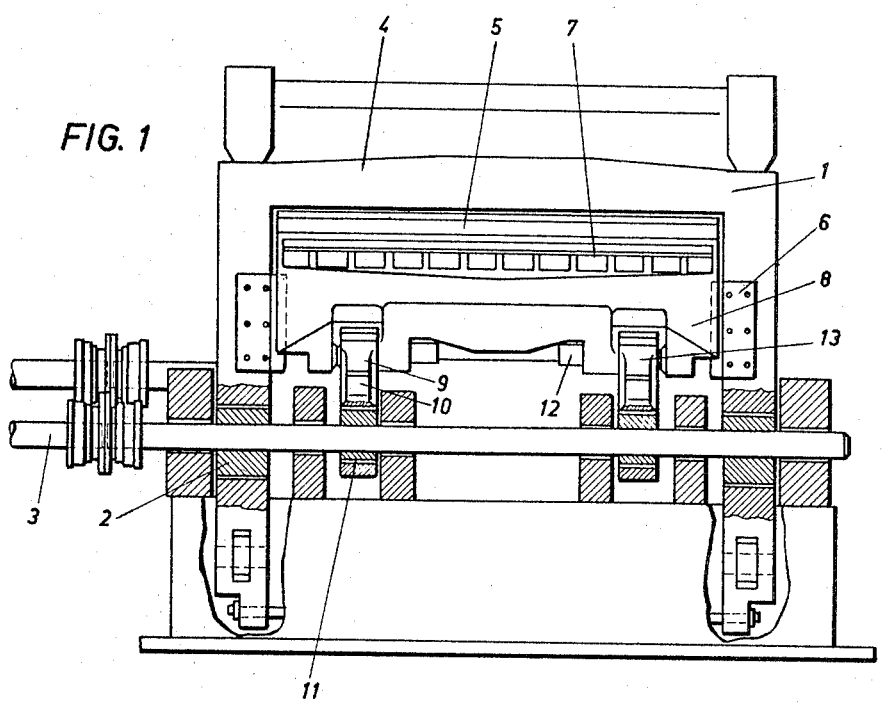

Oct. 18, 1966      E. BROMBACH ETAL      3,279,291

NO-CUT STROKE APPARATUS FOR FLYING SHEARS

Filed March 9, 1965

INVENTORS
ERNST BROMBACH &
ALBERT KIRCHNER
BY

THEIR ATTORNEY

United States Patent Office 3,279,291
Patented Oct. 18, 1966

3,279,291
NO-CUT STROKE APPARATUS FOR FLYING SHEARS
Ernst Brombach and Albert Kirchner, Dahlbruch Kreis Siegen, Germany, assignors to Siegner Maschinenbau G.m.b.H., a corporation of Germany
Filed Mar. 9, 1965, Ser. No. 438,333
Claims priority, application Germany, Mar. 21, 1964, S 90,152
9 Claims. (Cl. 83—304)

The invention relates to no-cut or no-load stroke devices employed with so-called flying shears having shear knives driven oppositely by means of continuous cranks or eccentrics staggered by 180° in relation to one another provided on a swing frame, the upper knife being fixedly mounted on the crosshead of the swing frame and the lower knife being arranged on a bottom knife beam moving in corresponding guides of the side cheeks of the swing frame. By means of one or several drive shafts having eccentrics the swing frame, and through connecting rods the bottom knife, are periodically moved in opposite directions.

Such shears have proven themselves for subdividing cutting stock, such as bands or lines consisting of metal or other materials. The problem of separating given sections of equal length from the cutting stock, whereby at least during the execution of the cut into the traveling cutting stock, the knives arranged in the swing frame are shifted ahead in the motional direction of the cutting stock at the same speed at which the cutting stock advances, has been resolved with such shears through the fact that both the rate of feed of the cutting stock and the cutting frequency of the shear knives are variable in a certain dependence of one another. Thus, for instance, the variable rate of feed can be effected through a correspondingly adjustable reducing gear train, which most often is designed as an infinitely variable speed transmission and so arranged that its driving speed is through a differential gear superimposed on the speed of the actual transmission gear of the conveying device and the exact conveying speed required for the operation of the swing shear can be adjusted. The change in the cutting frequency is with the usual arrangements achieved through a number of selectively connectable reducing ratios in the drive transmission of the swing frame. Through corresponding adjustment of the rate of feed and the cutting frequency, predetermined lengths of the cutting stock, also called base-lengths, can be severed with the shear. If sectional lengths exceeding the adjustable base-lengths are required, a base-length is to be set within the interval, whose integral multiple corresponds to the sectional length to be preselected, and by means of a special reducing gear associated with the bottom knife, a periodical one-time or multiple discontinuance, corresponding to the factor of the base-length, of the cutting process is effected after each cut, whereby the adjusted base-length is doubled or accordingly multipled. Thus, with known shears there are provided in the main transmission on the drive shafts for the lower and upper knife, on- and off-switchable sets of gears, whose number of teeth are so synchronized that bringing together of the top and bottom knife occurs in dependence of the adjustment with each swing of the swing frame or also with every second, third, fourth, fifth or sixth swing. Beyond that, with most of the known shears, the upper limit of the sectional length is restricted, because kinematics of the shear does not permit a greater number of no-load strokes between working cuts.

This drawback was eliminated with known shears in that the effective length or also the stroke of the connecting rod of the bottom knife beam was changed preferably by means of hydraulically acting adjusting instruments. In the case of shifting the point of engagement of a connecting rod or also of the direct shortening or lengthening of the connecting rods under the effect of hydraulic cylinders it became noticeable in an unfavorable manner that these adjusting instruments had to be designed for the full pressure existing at the bottom knife during the cut.

A suggestion has also been made to control no-load cuts by shifting the connecting rod working pins in the bottom knife beam. With this construction, servomotors through one or two toothed racks with pinions move a common eccentric shaft mounted in the bottom knife beam in such a manner that the bottom knife can be brought selectively into or out of the cutting position, in which it becomes necessary to do without the familiar regulating device for accurate adjustment of the cutters by means of eccentric pins provided in the lower knife beam, and in lieu thereof there is provided for an adjustable development of the top knife beams. This again has the drawback in that thereby the desired stiffness of the swing frame is impaired and in order to preserve the required stability under maintenance of the adjustability of the knives, the moving masses of the swing frame must be further enlarged.

In another known apparatus the above drawback was avoided in that the lengthening or shortening of the connecting rods is effected through the twisting of eccentrically developed bearing halves. In this case the complicated setup of the bearings under heavy load comprising several bearing halves encompassing one another turned out to be a drawback, and the required change of the hydraulically effected feed to a rotary movement resulted in considerable additional expenditure. Further difficulties resulted from the necessity of synchronizing the work of the adjusting instruments of both connecting rods in relation to one another so that the extension and retraction occurred in reciprocal synchronization.

Still another design is known in which the no-load cutting device consists of connecting rods developed like toggle levers, which through a common or separately arranged servomotor are straightened for an actual cut and bent for a no-load cut. This apparatus, however, has the drawback in that the toggle levers are fixed permanently on one side outside the swing frame and thereby do not assure the required synchronization of the contour track of the cutter edges.

The present invention eliminates the drawback of the known no-load cutting devices while preserving the stiffness of the swing frame and obtaining the desired and necessary adjustability of the bottom knife beam and assuring synchronization of the bottom knife contour track. The present invention proposes to design the connecting rods transmitting the bottom knife stroke subdivided in the longitudinal direction and to interconnect the parts through a reciprocating linkage system. Servomotors associated with the connecting rods in the working position maintain the parts of the rods in an essentially straightened position, whereas with opposite action the servomotors cause the parts of the connecting rods to bend inwardly to such a degree that the bottom knife remains beneath the range of action of the cutting stock. The thereby procured no-load cutting device at a minimum expenditure can be freely controlled at will.

In order to determine the position of the connecting rod parts, it is preferred to install hydraulically acting servomotors. It was deemed advantageous to connect the upper connecting rod parts hinged to the bottom knife beam to a shaft which, mounted in the bottom knife beam, at the same time represents also the swing bearing. Such a shaft interconnecting the connecting rods assures uniform bending of the connecting rods; beyond that it permits to equip the no-load cutting device with only one servomotor which engages one of the connecting rods or also a lever provided on the shaft.

It is further deemed useful to develop the links joining the connecting rod parts in such a manner, e.g. through associated supporting surfaces, that unilaterally they permit only a minimum exceeding of the straightened position or dead center and in this position support the parts of the connecting rods in taking over longitudinal forces.

For the attachment or engagement of the servomotors, there are associated with at least one of the connecting rods, levers projecting laterally from its parts on which the servomotor engages. It was also deemed advantageous, if necessary, to associate a laterally projecting lever to only one of the partial connecting rods; the servomotor engaging the latter supports itself against the bottom knife carrier. Moreover, if necessary, additional supporting surfaces with the links joining the partial connecting rods may be provided for also, thus limiting the field of transverse of the link in the direction of the bending side.

It may be deemed advantageous to associate directly with the servomotors the pilot valves effecting the control of the servomotors, for example by building them directly on the motors which will assure short connecting paths and a direct, free-from-delay action of the pistons of the servomotors. In connection herewith the pressure agent can be associated with the pilot valves through hose lines from spatially fixed pressure tanks.

Figure 2:
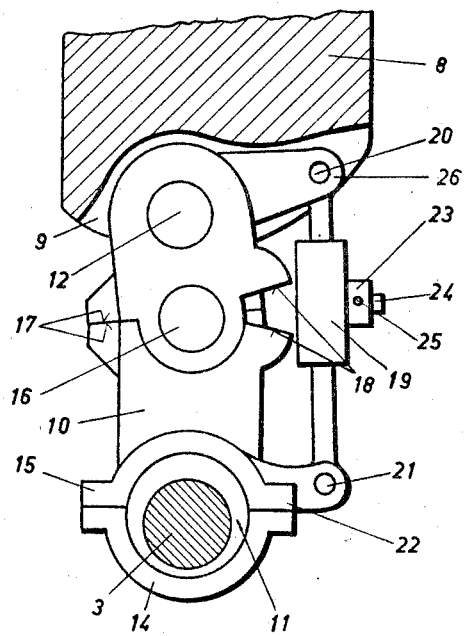

The above features of the present invention along with others will be better appreciated from the following description of the embodiment therein when read along with the accompanying drawings of which:

FIGURE 1 is a vertical section along the main drive shaft of a flying shear showing the no-load cutting device according to the invention, and FIGURE 2 is an enlarged view of a two-part connecting rod with servomotor engaging the bottom knife carrier.

FIGURE 1 serves to illustrate the essential parts of the swing frame shear which is provided with the no-load cutting device wherein a swinging shear frame 1 is mounted on eccentrics 2 of a main drive shaft 3 and is driven by the eccentrics. On its crosshead developed as a top knife beam 4 the swing frame carries a top knife 5. Shiftably arranged in guides 6 provided on the frame 1 is a bottom knife beam 8 carrying carrier 7 of the bottom knife. Through connecting rods made up of swivel-jointed parts 9 and 10, the bottom knife beam supports itself on eccentrics 11 provided on the main drive shaft 3. The connection of the rod parts 9 and 10 with the bottom knife beam 8 is effected by means of a shaft 12 which, mounted in the bottom knife carrier, is fixedly connected on both sides with the connection rod parts 9 and 13, so that forcibly guided, the swinging motions of the connecting parts 9 and 13 are always in harmony.

Individually, the build-up of the connecting rods with the no-load cutting device associated with them is explained in the enlarged representation of FIGURE 2. As seen in the direction of the connecting rods 9 and 10, the main drive shaft 3 is shown in section. The eccentric 11 provided on it is encompassed by bearings halves 14 and 15 of the connecting rod bottom part 10. Both parts of the connecting rod are swivel-jointed by means of a pin 16. The swivel movement of the linkage system, however, is so limited by supporting surfaces 17 and 18 associated with the parts 9 and 10, that in the drawing, toward the right, the linkage can be pushed through only a short distance beyond the straightened position of the parts 9 and 10, whereas toward the left, an essentially greater traverse is permitted; if in connection therewith the supporting surfaces 18 come into contact, the effective length of the connecting rod, represented by the distance between centers of the bearing halves 14 and 15 and the shaft 12, is decreased to such a degree that in the uppermost position of the eccentric 11 and therewith of the bottom knife beam 8, that the bottom knife can no longer perform the cut.

The swivel movement round the pin 16 is controlled by the hydraulic servomotor 19 engaging through pins 20 on a lever-like projection 26 of the connecting rod part 9 and through pins 21 on a leverlike projection 22 of the connecting rod part 10. The distances of the pins 20 and 21 from the connecting straight line of the axes of the bearing halves 14 and 15 with that of the shaft 12 are so selected here, that the servomotor 18 is not to be designed for great forces. The power to be furnished by the servomotor remains relatively slight especially in comparison with designs with direct hydraulic support, because the swing round the pin 16 does not occur during the cut and thereby the servomotor does not have to absorb either the full pressure of the cut. It is advantageous to effect the change-over essentially during the motional phases of the bottom knife beam 8, in which the latter, by reason of its motional inertia, does not transmit longitudinal forces to the connecting rods 9 and 10.

To achieve lesser delays of the control effected through signals, it is useful to arrange a valve 23 acting upon the servomotor 19 together with its driving device 24 directly on or at the servomotor. The feed of the pressure agent effecting the adjusting movements occurs here through a high-pressure hose not shown connected by means of a pipe or sleeve 25, the hose being in communication with a pressure medium tank. The discharge of the pressure medium emitted from the servomotor is effected accordingly. It also is advantageous with the described embodiment that the servomotor be acted upon essentially each time only briefly with full power, because with each upward movement, the link 16 supports itself through the bearing surfaces 17 and 18, so that the acceleration forces occurring only during the downwardly directed acceleration of the bottom knife carrier and partially compensated by the force of gravity, accordingly geared, engage on the servomotor 19.

If desirable, other operating methods can be engaged with the no-load cutting device. Thus, for instance, during the folding of the connecting rod parts, the bottom knife carrier can be deposited on stops provided in the swing frame, limiting its field of traverse within the guide 6, so that the drive effected through the eccentric 11, with the bottom knife carrier 7, securely deposited within the swing, causes only periodic folding of the connecting rods 9 and 10.

Through the connection of the two connecting rod upper parts 9 and 13 actuating the bottom knife beam 8 by means of the shaft 12, assurance is given here that both connecting rods fold each time by equal angular degrees and thereby are shortened by equal amounts. Moreover, as already described, only one servomotor may be provided for the no-load cutting apparatus, which engages on the shaft 12. If the asymmetrical load is not objectionable, the servomotor can be associated with only one of the connecting rods in which, through the shaft 12, there will occur each time the same equal folding of the connecting rod not having its own adjusting drive.

Also with the shaft 12 used as a connecting means of the two connecting rod upper parts, it can be used in a way known per se for the adjustment of the top knife. In this case the contact surfaces inside the bottom knife carrier 7 are arranged eccentrically in relation to the surfaces encompassed by the connecting rod upper parts, so that through release of the connection with the eccentric parts, twisting of the shaft 12 and restoration of the connection, there is the possibility at any time to effect adjustment of the bottom knife with simple means.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:

1. In a flying shear for cutting stock having upper and lower knives mounted in a frame and connected and driven in opposite directions to effect a cut by diametrically opposed eccentrics, said upper knife being held in position by a knife beam arranged in the frame, said frame being driven by one of the eccentrics, said bottom knife being longitudinally guided in the frame and supported on said other eccentric by means of a pair of connecting rods which transmit the cutting stroke to the bottom knife, means connected to the connecting rods and controllably determining the operative length thereof, the improvement comprising a no-load cutting device wherein said connecting rods each comprise two cooperating upper and lower parts, a link for connecting together the two parts in a manner to allow relative movement therebetween, a servomotor connected to at least one of the parts of each connecting rod so that when acting in a first direction they maintain the parts in an essentially straight position to transmit the cutting stroke to the bottom knife and when acted upon in a second direction, the servomotors cause the parts of the connecting rods to bend inwardly to such a degree that throughout the entire shearing cycle the bottom knife remains out of the shearing range with respect to the cutting stock.

2. A no-load cutting device according to claim 1, wherein said servomotors are hydraulically actuated.

3. A no-load cutting device according to claim 1, including a shaft connecting together the upper parts of the connecting rods, said upper parts being hinged to the bottom knife.

4. A no-load cutting device according to claim 3, wherein said servomotors are arranged to act directly upon said shaft.

5. A no-load cutting device according to claim 4, wherein said links are so constructed as to allow the link to exceed by a minimum the straightened position on one side and when in which position said connecting rod parts are supported to take over longitudinal forces.

6. A no-load cutting device according to claim 5, wherein at least one of the connecting rods has associated with its parts laterally projecting levers which are engaged by the servomotor associated with the connecting rod.

7. A no-load cutting device according to claim 5, wherein one of the connecting rod parts has a laterally projecting lever and wherein the servomotor engaging the lever is connected to the bottom knife.

8. A no-load cutting device according to claim 7, wherein the connecting rod parts have supporting surfaces which limit on both sides of the straight portion of the link the field of traverse of the links.

9. A no-load cutting device according to claim 8, including valves for effecting the control of the servomotors carried by the servomotors and control from a remote pressure medium source.

References Cited by the Examiner

UNITED STATES PATENTS

| 1,996,617 | 4/1935 | Hahn | 83—305 |
| 2,261,007 | 10/1941 | Talbot | 83—305 |
| 2,415,325 | 2/1947 | Wood | 83—305 X |
| 2,829,713 | 4/1958 | Nilsson | 83—305 X |

FOREIGN PATENTS 975,919  11/1964  Great Britain.

WILLIAM W. DYER, Jr., *Primary Examiner.*

J. M. MEISTER, *Assistant Examiner.*